July 11, 1950 R. R. SIMPSON 2,515,021
METER HOUSING ASSEMBLY
Filed July 17, 1947 2 Sheets-Sheet 1
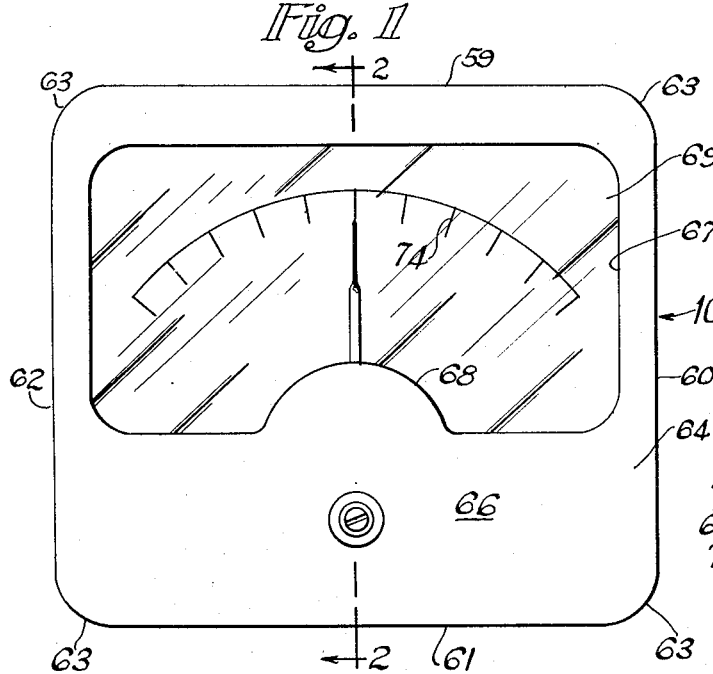
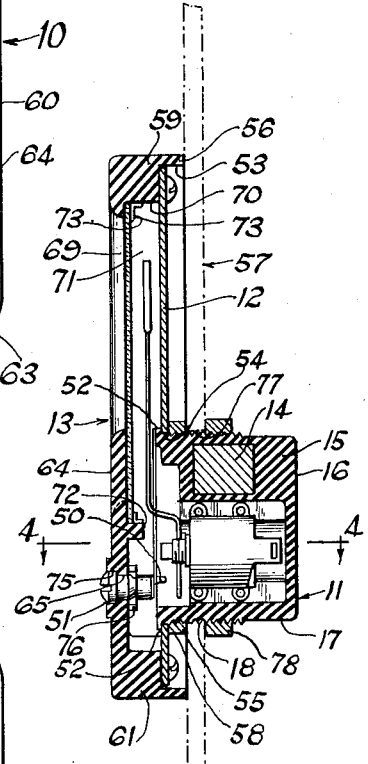
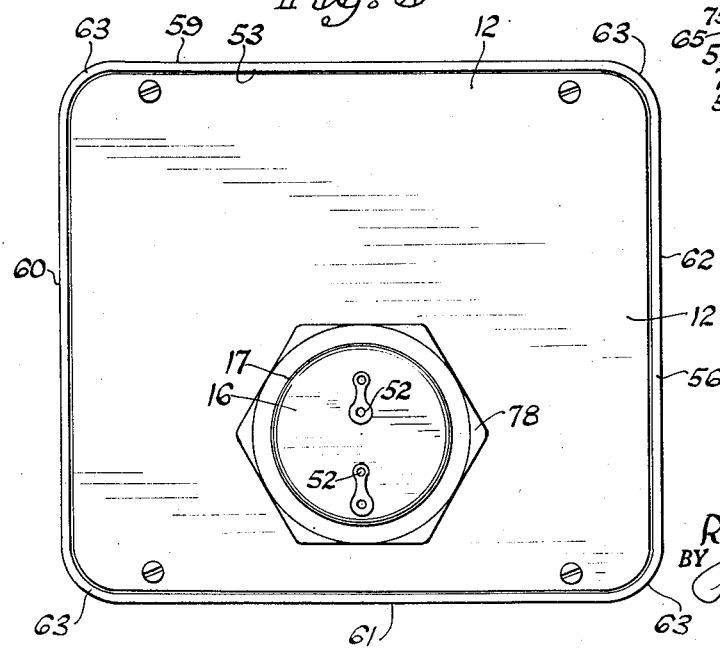
INVENTOR.
Ray R. Simpson
BY Robert H. Wendt
atty July 11, 1950     R. R. SIMPSON     2,515,021
METER HOUSING ASSEMBLY
Filed July 17, 1947     2 Sheets-Sheet 2

INVENTOR.
Ray R. Simpson
BY Robert H Wendt
Atty

Patented July 11, 1950

2,515,021

UNITED STATES PATENT OFFICE 2,515,021

METER HOUSING ASSEMBLY

Ray R. Simpson, River Forest, Ill., assignor to Simpson Electric Company, Chicago, Ill., a corporation of Illinois Application July 17, 1947, Serial No. 761,453

2 Claims. (Cl. 171—95)

The present invention relates to meter housing assemblies, and has for its principal object the simplification of a meter housing assembly so that meters with dials of any desired size may be employed and housed as desired by utilizing the same meter unit and providing a dial and dial frame of the size desired.

One of the objects of the invention is the provision of a simpler construction of meter housing assembly in which the dial itself is adapted to form a part of the housing for the pointer and the meter is housed by having its essential parts embedded or enclosed in a unitary member molded of a phenolic condensation compound.

Another object of the invention is the provision of an improved meter housing assembly which lends itself to the use of dials of any desired size so that the same movement and meter unit may be employed for relatively small dials or for relatively large dials without the necessity for providing any additional housing except that which is provided by the meter unit, the dial, and the dial frame.

Another object of the invention is the provision of an improved meter construction which may be provided with a dial of relatively large size so that the scale divisions may be as large as desired, but which may be readily mounted upon a panel by merely making a relatively small hole in the panel, the major portion of the indicating equipment being placed on the front of the panel and the meter unit passing through the panel and being used to support the assembly.

Another object of the invention is the provision of an improved meter and housing assembly which is simple in construction, capable of being manufactured at a very low cost, easily assembled, which involves a minimum amount of machining and other operations, which is adaptable to all kinds of meter installations, and which may be used for a long period of time without necessity for repair or replacement of any of its parts.

Other objects and advantages of the invention will be apparent from the following description and the accompanying drawings, in which similar characters of reference indicate similar parts throughout the several views.

Referring to the two sheets of drawings accompanying the specification,

Fig. 1 is a front plan view of the meter and housing assembly embodying the invention;

Fig. 2 is a vertical sectional view taken on the plane of the line 2—2 of Fig. 1, looking in the direction of the arrows, with a panel added in dot-dash lines;

Fig. 3 is a rear elevational view of the assembly of Fig. 1;

Figure 4:
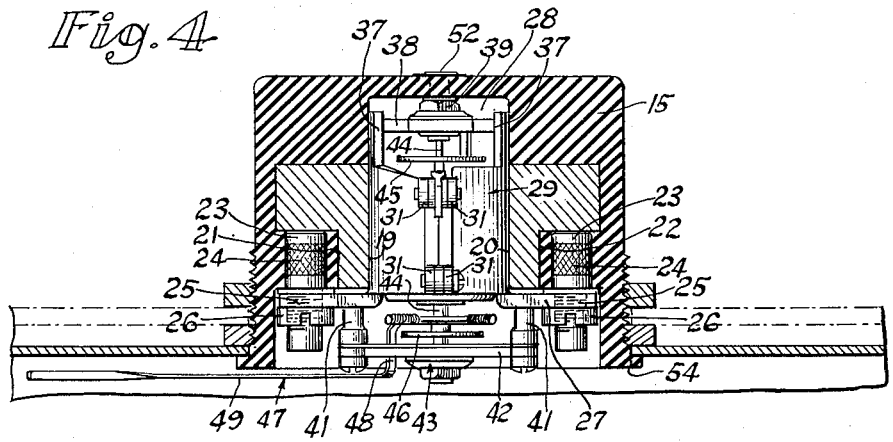
Fig. 4 is a fragmentary horizontal sectional view, taken on the plane of the line 4—4 of Fig. 5, the parts of the meter and movement being enlarged.

Referring to Figs. 1 to 3, 10 indicates in its entirety the instrument and housing assembly, which preferably includes a meter unit 11, a dial plate 12, and a front window frame 13. The meter unit 11 may consist of a unit in which the permanent magnet 14 is molded in a body of phenolic condensation compound 15.

This body is preferably substantially cylindrical in form, being provided with a plane rear side 16 and with a cylindrical side wall 17, the forward end of which is preferably threaded, as indicated at 18.

Figure 5:
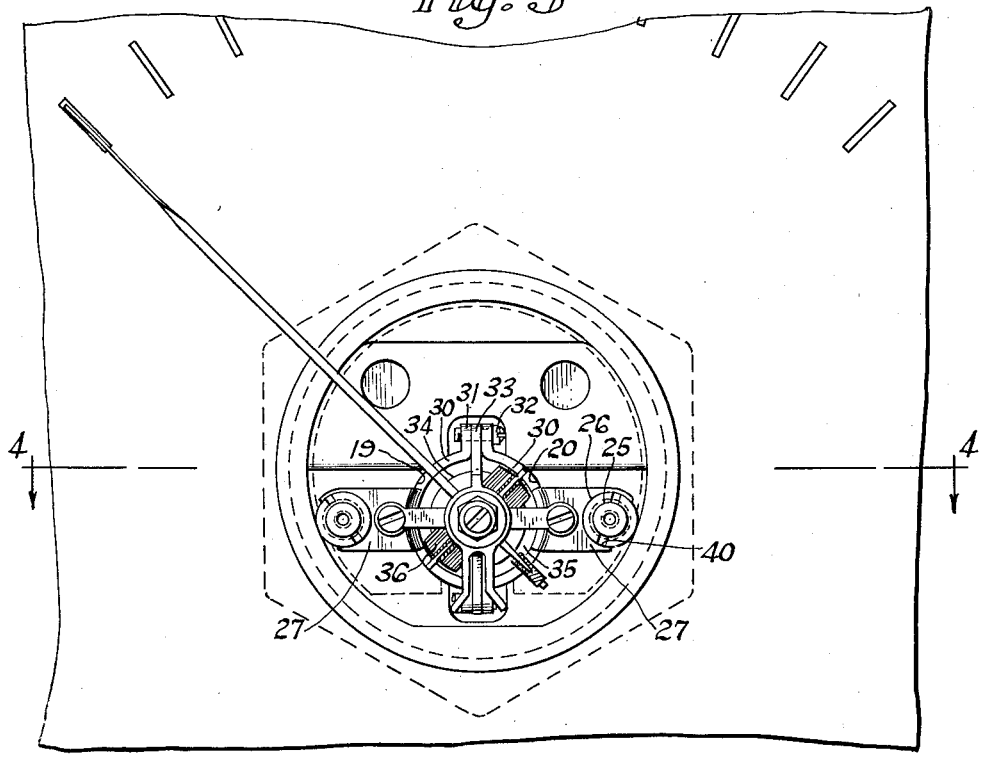
Fig. 5 is a fragmentary front plan view, taken from the bottom of Fig. 4.

The permanent magnet 14 is substantially U-shaped, but is provided with a pair of partially cylindrical pole faces (Fig. 5) 19 and 20 opposing each other, and the permanent magnet is recessed with an angular recess at 21, 22 (Fig. 4) to provide space for the molded insulating material and for a pair of metal inserts 23.

These metal inserts are substantially cylindrical members with a knurled surface 24 for anchorage in the molded material which surrounds them. They also have a threaded shank 25 projecting from the molded body 15 and adapted to receive the nuts 26, which clamp the securing flanges 27 of the movement in the body.

The molded body is formed with a substantially cylindrical recess, in which the phenolic condensation compound covers even the pole faces 19, 20 with a thin skin of insulating material and forms a cylindrical recess 28 for receiving the movement.

The movement comprises a unit 29 which has a pair of half cylindrical housing members 30 of magnetic material, these housing members having laterally projecting securing flanges 31 by means of which they are secured together.

Rivets or screw bolts 32 pass through the flanges 31 and also through the supporting members 33, which carry a centrally located cylindrical core 34, leaving an annular recess 35 between the core and the housing members or pole pieces 30, within which the moving coal unit 36 rotates.

At one end the two pole piece members 30 are each provided with longitudinally extending flange 37, which carries an insulating fiber bridge 38 for supporting the jewel assembly 39. At the other end the pole piece members 30 carry the attaching flanges 27, which are bent laterally to engage the shank 25 of the inserts 23.

Each flange 27 has a partially circular recess 40 for receiving the shank of the insert 23. The flanges 37 also support the posts 41, which carry a bridge 42 of nonmagnetic metal for supporting the jewel assembly 43 at this end.

The moving coil unit 36 is provided with the usual spindle 44 at each end for pivotal mounting in the jewel assemblies 39 and 43 and with the spiral springs 45 and 46 at each end for resisting torque that is produced by the moving coil 36. The spindle 44 carries the pointer 47, which is provided with an axially extending portion 48 carrying the elongated pointer portion 49, which may be as long as desired, depending upon the size of the dial.

The spring 46 may have its end connected to the usual zero adjustment member, having a fork which is engaged by the eccentric pin 50 of the zero adjuster 51. The leads from the movement may be brought out to a pair of tubular rivets 52 (Fig. 4), the apertures of which are closed by a drop of solder when they are connected to instrument leads that are placed in the aperture of the tubular rivet.

The cylindrical body 15 is preferably provided at its forward end with a radially extending annular flange 52. This is employed for engaging one side of the dial 12, which may be of any size or shape. In the present embodiment the shape of the dial 12 is substantially rectangular, with rounded corners, this being complementary to the rectangular recess 53, which is formed in the rear side of the window frame 13.

The dial 12 is provided with a circular recess 54, preferably located adjacent its lower edge so as to leave the upper part of the dial for the scale divisions and numerical indicia. The aperture 54 is large enough to receive the insulating body 15 of the meter unit 11. A mounting nut 55 is threaded on the threaded portion 18 of the meter unit 11 until it clamps the dial 12 against the flange 52.

Thus the dial 12 and the meter unit 11 are secured together. The recess 53 in the window frame 13 for the dial 12 is preferably deeper than the thickness of the dial, and preferably equal to substantially the thickness of the dial 12 and the mounting nut 55 so that the window frame 13 has a rearwardly projecting flange 56 adapted to engage a panel 57 when the nut 55 engages the panel.

Nut 55 preferably has a noncircular periphery 58. The window frame 13 may be made of any suitable material, such as a molded phenolic condensation compound; or it may be made of a cast metal of nonmagnetic characteristics, such as one of the light metals. This frame is substantially rectangular in shape, having the four straight sides 59—62 and the rounded corners 63. Its face 64 may be plane and imperforate at its lower side, except for the bore for the zero adjustment screw 51.

Thus the movement is entirely concealed by the apron portion 66 of the face. At its upper portion the window frame 13 is provided with a window opening 67, which may assume any desired shape, but is preferably substantially rectangular in the meter illustrated. The apron 66 has a partially circular portion 68 projecting into the window opening 67 and aiding in completely concealing the movement.

A transparent window 69, comprising a sheet of glass or transparent plastic, is of sufficient size to engage the inside of the top wall 70 and the inside of the side walls 71; and it may extend below into engagement with an inwardly extending lug 72.

A rectangular bezel frame 73, which is angular in cross section, may fit in the window frame 13 against the walls 70, 71 and lug 72 to hold the window 69 in place.

The dial 12 is, of course, provided with suitable scale divisions 74 and numerical indicia for indicating the reading of the meter. The zero adjustment member 51 may consist of a substantially cylindrical member secured in the bore 65 with its head in counterbore 75 and secured by means of a nut 76.

At its inner end it bears the eccentric pin 50, which engages the fork of the zero adjustment member that supports one end of the spring 46. The assembly may be secured upon a panel by providing the panel with a threaded bore, or by having a smooth bore 77 for receiving the cylindrical body of the meter unit 11. A second clamping nut 78 is then threaded on the threaded portion 18 behind the panel until the panel is clamped between the nuts 55 and 78.

The operation of the present meter will be apparent from the foregoing description of its parts. It should also be noted that according to the foregoing construction the meter unit 11 may be provided with a pointer and dial housing requiring only two parts; that is, the dial and the window frame with its window. It is unnecessary to provide a separate housing for the meter unit 11, as all of its parts are already hermetically sealed within the molded insulation 15.

Thus the meter unit 11 may be provided with dials and window frames of any desired size by increasing the length of the pointer; and the legibility of the scale divisions and indicia may be increased as desired. The same legibility can be secured by the use of this very small meter unit 11 as is secured by using relatively large meter construction, at a minimum cost.

All of the other parts of the housing for the meter may be eliminated except the dial and the window frame with its window, in the present construction, because the molding and housing of the magnet and other parts of the meter in a phenolic condensation compound body makes it unnecessary to provide any other housing for the movement. The present construction is dust-tight and simple and capable of being constructed at a minimum cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an electrical instrument housing, the combination of an electrical instrument movement including a cylindrical molded insulating body for supporting the movement, said body being provided with external threads at its forward end and with an annular stop flange at the forward end of said threads, with a dial plate, said dial plate being many times the area of said cylindrical body, said dial plate having a lower cylindrical aperture for passing the threaded portion of said body and engaging the rear side of said annular flange, and an internally threaded ring threadedly mounted on the body and clamping the dial plate against an annular flange, said movement having an upwardly extended elongated pointer, and said dial plate having an arcuate scale with scale divisions spaced proportionately to the distance of the scale from the movement, and a cover plate of molded insulating material, said cover plate being formed with a window opening of sufficient size to expose said scale and the end of said pointer, a transparent member closing said window opening, the said cover having an opaque portion covering said movement, said cover having a rearwardly extending border flange for engaging a panel, said border flange surrounding a seating surface forming a recess for receiving said dial plate, and means for securing the edges of the dial plate to the cover to provide an enclosed housing with a more readable dial on a larger scale for a relatively small meter movement.

2. In an electrical instrument housing, the combination of an electrical instrument movement including a cylindrical molded insulating body for supporting the movement, said body being provided with external threads at its forward end and with an annular stop flange at the forward end of said threads, with a dial plate, said dial plate being many times the area of said cylindrical body, said dial plate having a lower cylindrical aperture for passing the threaded portion of said body and engaging the rear side of said annular flange, and an internally threaded ring threadedly mounted on the body and clamping the dial plate against an annular flange, said movement having an upwardly extended elongated pointer, and said dial plate having an arcuate scale with scale divisions spaced proportionately to the distance of the scale from the movement, and a cover plate of molded insulating material, said cover plate being formed with a window opening of sufficient size to expose said scale and the end of said pointer, a transparent member closing said window opening, the said cover having an opaque portion covering said movement, said cover having a rearwardly extending border flange for engaging a panel, said border flange surrounding a seating surface forming a recess for receiving said dial plate, and means for securing the edges of the dial plate to the cover to provide an enclosed housing with a more readable dial on a larger scale for a relatively small meter movement, the said body extending through an aperture on a panel, and a second internally threaded ring threadedly mounted on said threads for clamping the housing to a panel, the thickness of the first-mentioned internally threaded ring and the width of said border flange beyond said dial plate being substantially the same so that the edge of the border flange and the first-mentioned internally threaded ring engage the panel when the second internally threaded ring is threaded against the rear side of the panel.

RAY R. SIMPSON.

REFERENCES CITED

The following references are of record in the file of this patent:

UNITED STATES PATENTS

| Number | Name | Date |
| --- | --- | --- |
| 1,116,498 | Schubert | Nov. 10, 1914 |
| 1,195,712 | Norton | Aug. 22, 1916 |
| 1,806,295 | Kinnard | May 19, 1931 |
| 1,899,885 | Simpson | Feb. 28, 1933 |
| 2,051,399 | Simpson | Aug. 18, 1936 |
| 2,150,836 | Lamb | Mar. 14, 1939 |
| 2,346,572 | Goodwin | Apr. 11, 1944 |

FOREIGN PATENTS

| Number | Country | Date |
| --- | --- | --- |
| 363,205 | France | July 24, 1906 |
| 9,408 of 1915 | Great Britain | June 1, 1916 |